Figure 1:
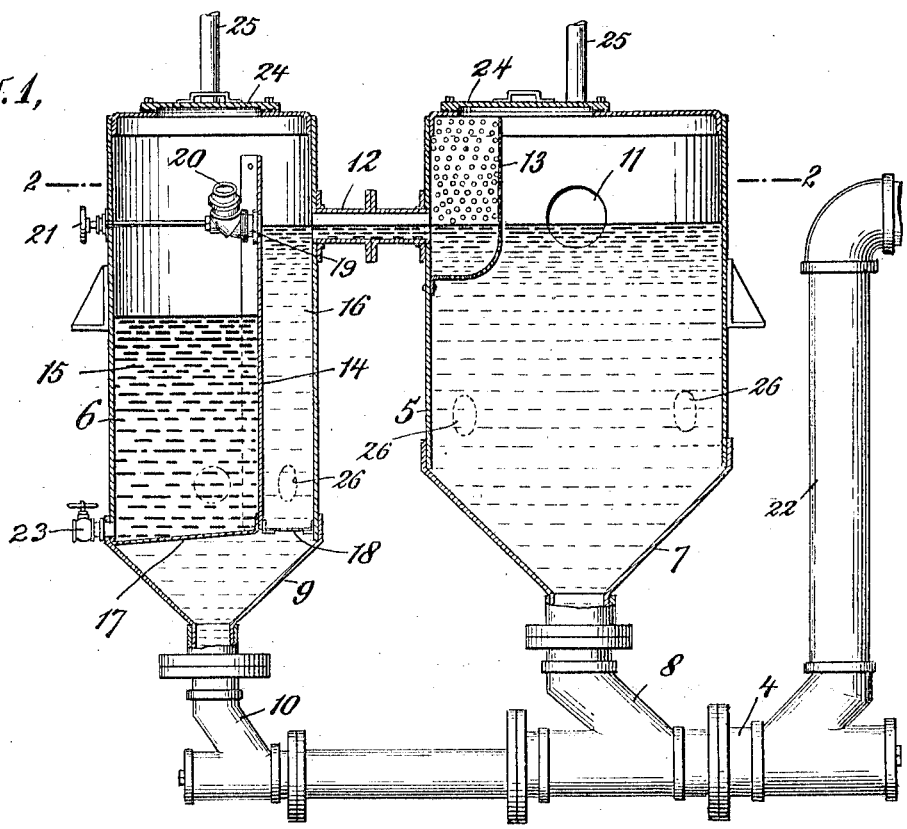

F. J. MAYWALD.
OIL SEPARATOR.
APPLICATION FILED MAY 3, 1911.

1,048,717.

Patented Dec. 31, 1912.

WITNESSES:
F. B. Graves
Lyman Andrews Jr

INVENTOR
Frederick J. Maywald
BY
Chapin Maywald
his ATTORNEYS

UNITED STATES PATENT OFFICE.

FREDERICK J. MAYWALD, OF BROOKLYN, NEW YORK.

OIL-SEPARATOR.

1,048,717.  Specification of Letters Patent.  Patented Dec. 31, 1912.

Application filed May 3, 1911. Serial No. 624,719.

*To all whom it may concern:*

Be it known that I, FREDERICK J. MAYWALD, a citizen of the United States of America, and a resident of the borough of Brooklyn, county of Kings, and State of New York, have invented certain new and useful Improvements in Oil-Separators, of which the following is a specification, reference being had to the accompanying drawings, forming a part thereof.

My invention relates to oil separators by which the separation of oils and water is accomplished as a result of their difference in specific gravity, and the particular class of oil separators to which my invention relates is that employed in the drainage system of houses, manufacturing plants, garages, and the like, such separators being employed for the purpose of preventing oils, and particularly volatile oils, as gasolene, from entering the sewer.

Such a separator comprises in general two vessels,—one a receiving vessel and the other a separating and storage vessel. An initial separation takes place in the receiving vessel, the floating oil being carried therefrom into the second vessel and in this vessel a second separation takes place after settlement, the oil floating off into the storage portion of the second vessel. The two vessels mentioned are usually in communication at their upper and lower end in order to permit free circulation, and one of the vessels, usually the first one, is connected near the bottom thereof with the sewer, through a suitable riser constituting a trap discharge.

As this class of oil separator is commonly employed in connection with the usual drainage system, it follows that not only oil and water is received therein but also other matter of more or less solid nature, and particularly is this true in garages and manufacturing establishments where waste material is quite commonly thrown down the plumbing fixtures; and it has been found in practice that the vessels are likely to become clogged up and choked with this solid material, the receiving vessel having been found in some cases to be absolutely filled solid with such material.

In my present invention I overcome this difficulty by providing the two vessels with separate and independent discharges which communicate with a common pipe leading to the sewer, the bottoms of the vessels being conical in form at the part wherein they lead to this common discharge pipe, so that there is always a free discharge from both of the vessels directly to the sewer.

My invention also consists in an adjustable discharge nozzle for the oil as it flows from one chamber to another so as to accurately determine the level at which the separation shall be effected. This is advantageous as permitting the vessels to be used for the separation of oils of varying specific gravities for obviously the level should be higher for the separation of a lighter oil than it should be for the separation of a heavier oil.

My invention also consists in certain novel details of construction and combinations of parts such as will be fully pointed out hereinafter, and in order that my invention may be thoroughly understood, I will now proceed to describe a structure constituting an embodiment thereof, having reference to the accompanying drawings illustrating the same, and will then point out the novel features in claims.

Figure 2:
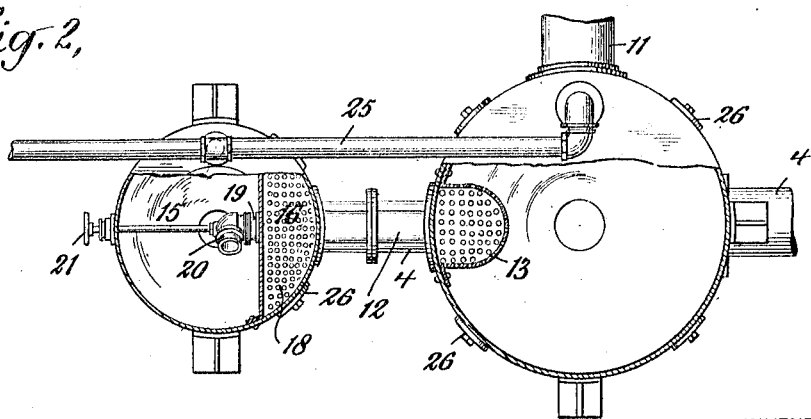

In the drawings: Figure 1 is a view in central vertical section of an oil separator constructed in accordance with my invention. Fig. 2 is a partial top view and view partly in horizontal section of the same.

The apparatus comprises a receiving tank 5 and a separator tank 6, each of which has a direct connection with the sewer. The receiving tank 5 is generally of cylindrical form and has a conical base 7, the lower end of which connects with an elbow 8 in a pipe 4 which communicates directly with the sewer. The lower end of the vessel 6 is similarly provided with a conical base 9 which communicates through an elbow 10 with the same pipe 4, and hence with the sewer. Near its upper end the receiver 5 has a lateral opening 11 through which it receives the material to be operated upon. A pipe connection 12 between the two vessels, near their upper ends, affords an overflow passage through which the liquid at the upper end of the vessel 5 may pass therefrom into the vessel 6, a screen 13 around the inlet to the said pipe 12 affording means for preventing any floating solid matter from passing from one vessel to the other with the liquid. The vessel 6 contains a vertical partition 14 which divides the interior thereof into two chambers 15—16. The lower end of the chamber 15 is closed by a solid diaphragm 17, while the lower end of the chamber 16 is in open communication through a perforated diaphragm 18 with the conical base 9. Near its upper end the partition 14 has an opening therein to which is connected a pipe 19, and the said pipe is provided with an elbow 20 which is angularly adjustable from the exterior of the vessel 15 by means of a hand wheel 21. By angularly adjusting the said elbow the upper level thereof may be varied, and by this means the level at which liquid will flow from the chamber 16 into the chamber 15 will be varied.

The operation of the apparatus is as follows:—Refuse material, including oil and water, enters the vessel 5 through the inlet 11 and will rise therein up to the level determined by the vertical riser 22 from the pipe 8 and by which connection is effected with the sewer. The oil which is lighter than the water, and is therefore contained in the upper part of the vessel, flows through the connecting pipe 12 into the chamber 16 in the vessel 6. It fills up this chamber until a level therein is reached equal to the level of the upper end of the elbow 20. The upper portion of the liquid then flows through the pipe 19 and elbow 20 into the chamber 6 where it is collected and from whence it may be drawn off from time to time through a valve 23.

From the foregoing it will be seen that a double separation takes place. First of all the upper part of the liquid only is drawn from the vessel 5, the balance discharging directly through the elbow 8 into the pipe 4, and thence through the riser 22 into the sewer. That portion of the liquid which flows through the pipe 12 into the vessel 16 again settles and the upper portion thereof only is discharged into the chamber 15, the heavier liquids from the chamber 16 passing down through the conical base 9 and the elbow 10 into the pipe 4, and thence through the riser 22 into the sewer.

The adjustment of the level of the discharge from the chamber 16 into the chamber 15 which is effected in the present instance by adjusting the elbow 20, is advantageous because different conditions, such for instance as a difference in specific gravity of the oils received, require a different level for the most efficient operation. Hence by the provision of an adjustment accessible from the exterior provision is made for readily meeting any conditions that may arise.

The tops of the vessels may be provided with the usual removable covers or manholes 24, and suitable vents 25 may also be provided for the purpose of preventing other than atmospheric pressure in the said chambers. Suitable hand-holes 26 may also be employed for permitting access to the interior of the vessels for cleaning and similar purposes.

What I claim is:

1. An oil separator comprising a receiving vessel having an inlet, a separating and storage vessel having a separating compartment and a storage compartment, a communicating connection between said receiving vessel and said storage compartment near the upper portions thereof, a connection between the two compartments, and means for adjusting the height of the connection between said compartments, said connection also controlling the level of the liquid in said receiving vessel and in said separating compartment.

2. An oil separator containing two chambers, and having an adjustable connection for permitting liquid to overflow from one of the said chambers into the other, the said connection including an angularly movable elbow, and means for operating the same from the exterior of the separator.

3. An oil separator comprising a receiving vessel having an inlet and an outlet connection, a second vessel divided into two compartments, and a communicating connection between the receiving vessel and one of said compartments, said connection leading from the receiving vessel near the upper portion thereof, a connection between the two compartments of the second vessel variable in height, and a connection from the bottom of said first compartment to the outlet connection of the receiving vessel.

4. An oil separator comprising a receiving vessel having an inlet and an outlet connection, said outlet being connected with a drain pipe placed at a level corresponding with the upper part of said vessel, a second vessel divided into two compartments, a communicating connection between the receiving vessel and the first of said compartments near the upper portions thereof at about the level of the drain pipe, a connection between the two compartments of the second vessel, means for adjusting the height of said connection, and a connection from the bottom of said first compartment to the outlet connection of the receiving vessel.

5. An oil separator comprising a receiving vessel having an inlet at the upper part thereof, a conical base and a discharge at the lower end of said base; a second vessel also having a conical base and a discharge at the lower end of its base, said second vessel being divided into two compartments, a communicating connection between the receiving vessel and one of said compartments, said connection leading from the receiving vessel near the upper portion thereof, a connection between the two compartments of the second vessel variable in height and a connection from the bottom of said first compartment into the conical base of said second vessel.

6. An oil separator comprising a receiving vessel having an inlet at the upper part thereof, a conical base and a discharge at the lower end of said base; a second vessel also having a conical base and a discharge at the lower end of its base, a common waste pipe with which both of said discharges are connected, said second vessel being divided into two compartments, a communicating connection between the receiving vessel and one of said compartments, said connection leading from the receiving vessel near the upper portion thereof, a screen over the inlet of said connection, a connection between the two compartments of the second vessel variable in height, a connection from the bottom of said first compartment into the conical base of said second vessel and a screen in the latter connection.

7. An oil separator comprising a receiving vessel open to atmospheric pressure, an inlet connection in the upper portion of the receiving vessel, and an outlet connection in the lower portion of said vessel connected with a drain-pipe placed at a level corresponding with the upper part of said receiving vessel; a second vessel divided into two compartments both open to atmospheric pressure, a communicating connection between the receiving vessel and the first of said compartments near the upper portions thereof at about the level of said drain pipe, a connection from the lower part of said first compartment and the outlet connection of the receiving vessel whereby the liquid levels in the receiving vessel and in said first compartment is governed by the level of the drain-pipe, a connection between the two compartments of said second vessel, above the level of the drain-pipe and a draw-off pipe from the lower part of the second compartment of said second vessel.

FREDERICK J. MAYWALD.

Witnesses:
D. HOWARD HAYWOOD,
F. B. GRAVES.